(12) United States Patent
Meyers et al.

(10) Patent No.: US 8,675,220 B2
(45) Date of Patent: Mar. 18, 2014

(54) INTERNET FAX MESSAGE SEARCHING AND FAX CONTENT DELIVERY USING KEYWORD DETECTION

(75) Inventors: Mark Edward Meyers, Redondo Beach, CA (US); Matthew Curtis Mabry, Beverly Hills, CA (US)

(73) Assignee: j2 Global Communications, Inc., Hollywood, CA (US)

( * ) Notice: Subject to any disclaimer, the term of this patent is extended or adjusted under 35 U.S.C. 154(b) by 1486 days.

(21) Appl. No.: 12/256,423

(22) Filed: Oct. 22, 2008

(65) Prior Publication Data
US 2010/0097634 A1    Apr. 22, 2010

(51) Int. Cl.
G06F 3/12    (2006.01)
H04N 1/40    (2006.01)
G06K 9/60    (2006.01)
G06K 9/20    (2006.01)

(52) U.S. Cl.
USPC ........... 358/1.15; 358/462; 382/306; 382/321

(58) Field of Classification Search
None
See application file for complete search history.

(56) References Cited

U.S. PATENT DOCUMENTS

| | | | |
|---|---|---|---|
| 4,918,588 A | 4/1990 | Barrett et al. | |
| 4,974,254 A | 11/1990 | Perine et al. | |
| 5,191,525 A | 3/1993 | LeBrun et al. | |
| 5,235,433 A | 8/1993 | Clarkson et al. | |
| 5,404,435 A | 4/1995 | Rosenbaum | |
| 5,459,482 A * | 10/1995 | Orlen | 345/98 |
| 5,490,217 A | 2/1996 | Wang et al. | |
| 5,517,586 A | 5/1996 | Knowlton | |
| 5,598,557 A | 1/1997 | Doner et al. | |
| 5,680,223 A | 10/1997 | Cooper et al. | |
| 5,850,490 A | 12/1998 | Johnson | |
| 5,861,959 A | 1/1999 | Barak | |
| 5,893,908 A | 4/1999 | Cullen et al. | |
| 5,970,484 A | 10/1999 | Church et al. | |
| 6,005,680 A | 12/1999 | Luther et al. | |
| 6,020,981 A | 2/2000 | Ogiyama | |
| 6,028,680 A | 2/2000 | Seo | |
| 6,046,824 A | 4/2000 | Barak | |
| 6,058,435 A | 5/2000 | Sassin et al. | |
| 6,141,116 A | 10/2000 | Odom et al. | |
| 6,397,213 B1 | 5/2002 | Cullen et al. | |
| 6,463,426 B1 | 10/2002 | Lipson et al. | |

(Continued)

OTHER PUBLICATIONS

Likforma-Sulem, Laurence, et al., "Facsimile Processing for a Messaging Server", 10th International Workshop on Database Expert Systems Applications (1999), (5 pages).

(Continued)

*Primary Examiner* — Vincent Rudolph
(74) *Attorney, Agent, or Firm* — Blakely, Sokoloff, Taylor & Zafman LLP

(57) ABSTRACT

A system for providing an internet fax service has an engine to process a raw fax document, received for a user of the internet fax service, using digital character recognition to produce recognized text or an associated formatted text document. A conversion engine may convert the raw fax to native file format being one of a) word processor format, b) spreadsheet format, c) slide presentation format, or d) another format that can be read on a user interface. An internet server is to make the native file format document available to the user over an internet. A fax content processing unit is to perform keyword scanning of the recognized text, and then allows the user to search for stored faxes by keyword. Other embodiments are also described.

18 Claims, 6 Drawing Sheets

(56) References Cited

U.S. PATENT DOCUMENTS

| | | |
|---|---|---|
| 6,480,304 B1 | 11/2002 | Os et al. |
| 6,493,705 B1 | 12/2002 | Kobayashi et al. |
| 6,564,321 B2 | 5/2003 | Bobo, II |
| 6,574,616 B1 | 6/2003 | Saghir |
| 6,665,687 B1 | 12/2003 | Burke |
| 6,694,307 B2 | 2/2004 | Julien |
| 6,741,745 B2 | 5/2004 | Dance et al. |
| 6,868,143 B1 | 3/2005 | Menon et al. |
| 6,906,817 B1 | 6/2005 | Berard et al. |
| 6,944,272 B1 | 9/2005 | Thomas |
| 6,944,344 B2 | 9/2005 | Imagawa et al. |
| 7,099,023 B2 | 8/2006 | Chrisop et al. |
| 7,239,406 B1 | 7/2007 | Piersol et al. |
| 7,251,644 B2 | 7/2007 | Viola et al. |
| 7,274,476 B2 | 9/2007 | Eguchi et al. |
| 7,334,729 B2 | 2/2008 | Brewington |
| 7,464,085 B2 | 12/2008 | Ferlitsch |
| 2004/0136513 A1 | 7/2004 | Chiu |
| 2004/0218226 A1 | 11/2004 | Antognini |
| 2006/0215936 A1* | 9/2006 | Dorfman et al. ............. 382/306 |
| 2006/0238822 A1 | 10/2006 | Van Hoof |
| 2007/0008574 A1* | 1/2007 | Henry et al. ................. 358/1.15 |
| 2007/0058867 A1* | 3/2007 | Shieh ............................ 382/182 |
| 2008/0273221 A1* | 11/2008 | Couchman et al. ......... 358/1.15 |
| 2009/0161955 A1* | 6/2009 | Isshiki ......................... 382/177 |
| 2009/0190159 A1* | 7/2009 | Toscano et al. ............. 358/1.15 |
| 2009/0248528 A1* | 10/2009 | Bayhack ..................... 705/14.52 |
| 2010/0145808 A1* | 6/2010 | Hilbert et al. ............. 705/14.66 |

OTHER PUBLICATIONS

Likforma-Sulem, Laurence, et al., "Proper Names Extraction from Fax Images Combining Textual and Image Features", Seventh International Conference on Document Analysis and Recognition (ICDAR '03), vol. 1, 2003 IEEE, (pp. 545-549).

Witten, Ian H., et al., "Digital Libraries Based on Full-Text Retrieval", Communications of the ACM (1998), Internet download at: http://citeseerx.ist.psu.edu/viewdoc/summary?doi=10.1.1.38.7794, (10 pages).

PCT International Preliminary Report on Patentability (dated May 5, 2011), International Application No. PCT/US2009/060452, International Filing Date—Oct. 13, 2009, (10 pages).

Likforman-Sulem, Laurence, "Name Block Location in Facsimile Images Using Spatial/Visual Cues", *Document Analysis and Recognition, 2001, Proceedings Sixth International Conference* on Sep. 10, 2001-Sep. 13, 2001, Seattle, WA, USA, ISBN: 0-7695-1263-1, (pp. 680-684).

PCT International Search Report and Written Opinion (dated Feb. 18, 2010), International Application No. PCT/US2009/060452, International Filing Date—Oct. 13, 2009, 17 pages.

* cited by examiner

Fax Delivery and Storage System (100)

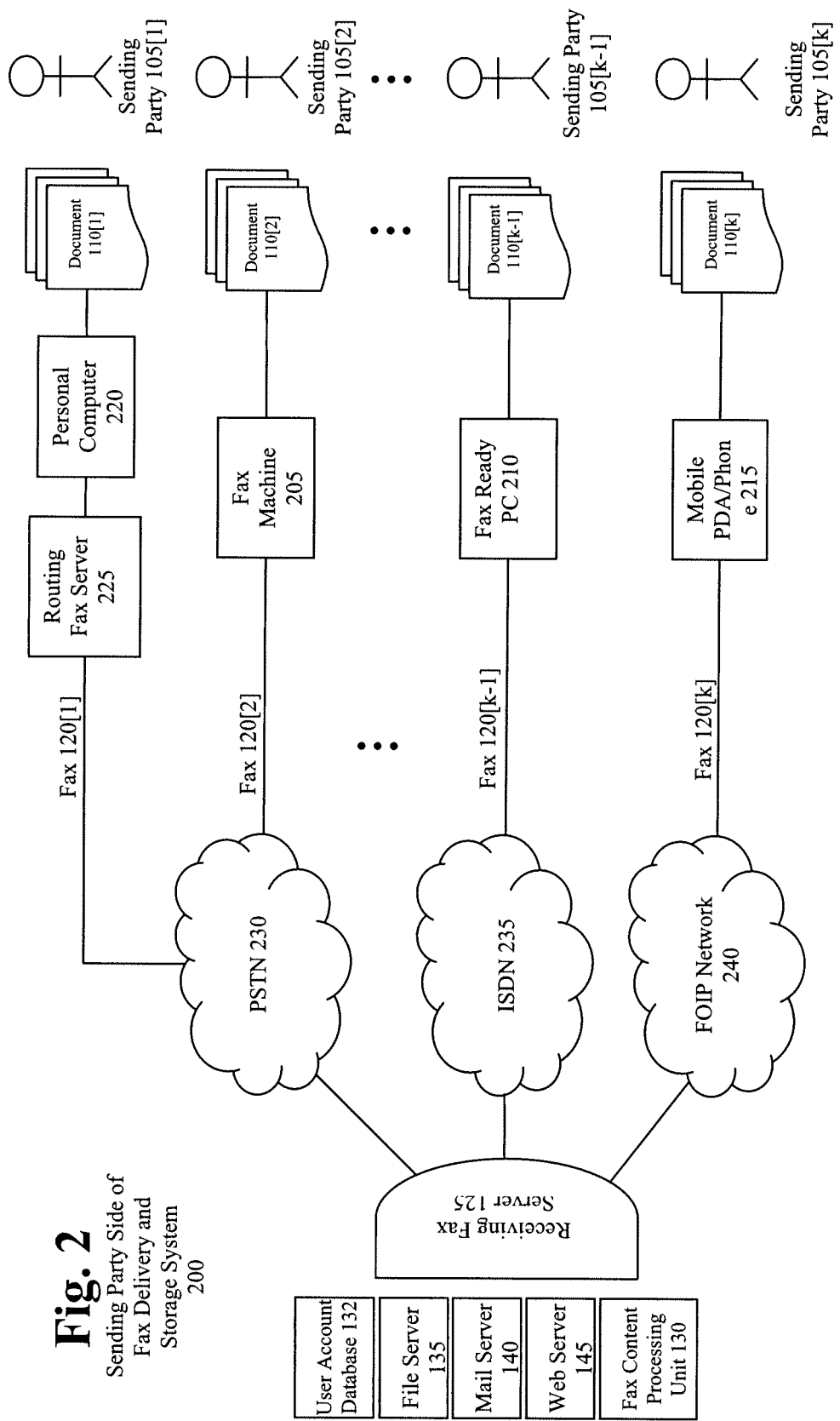

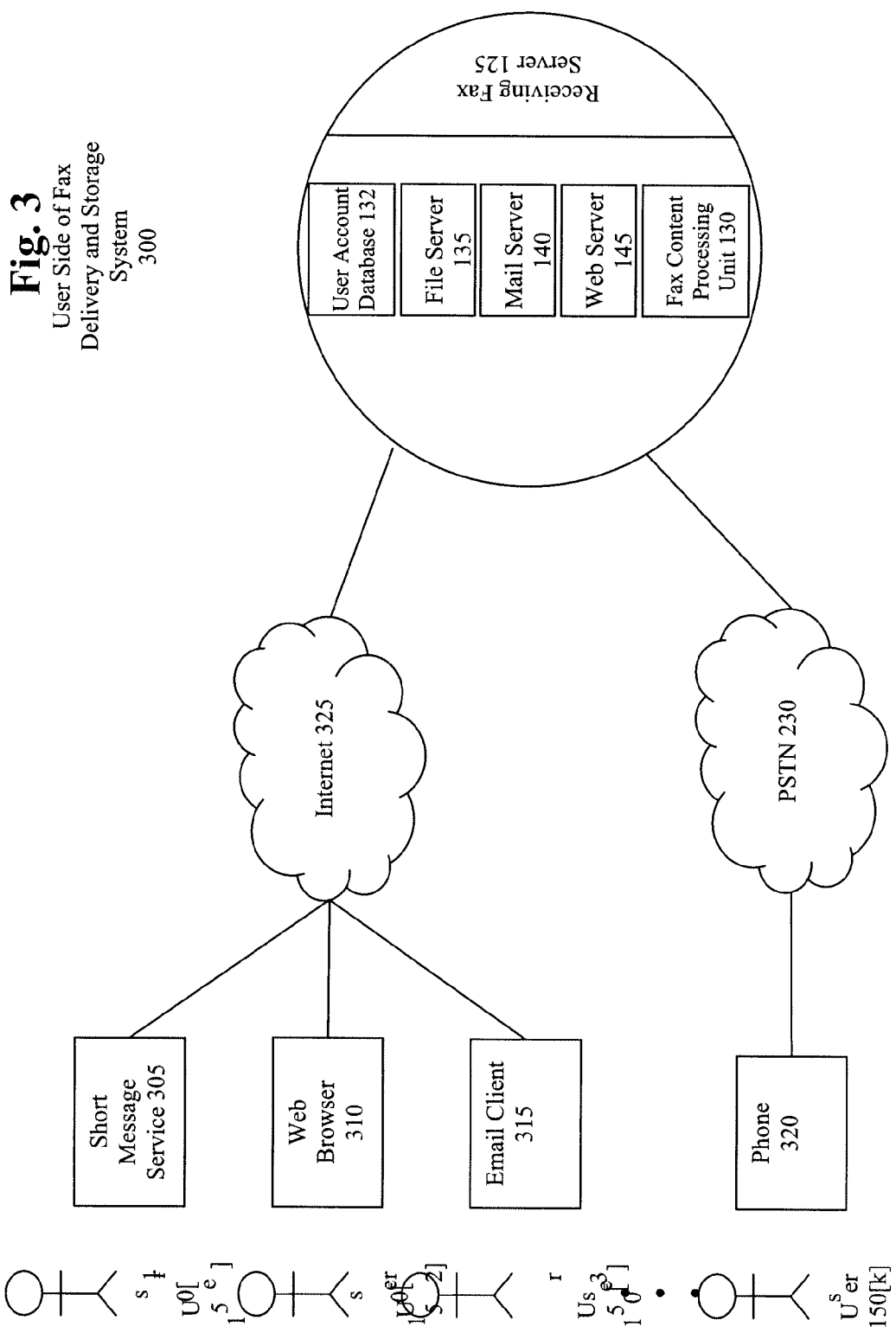

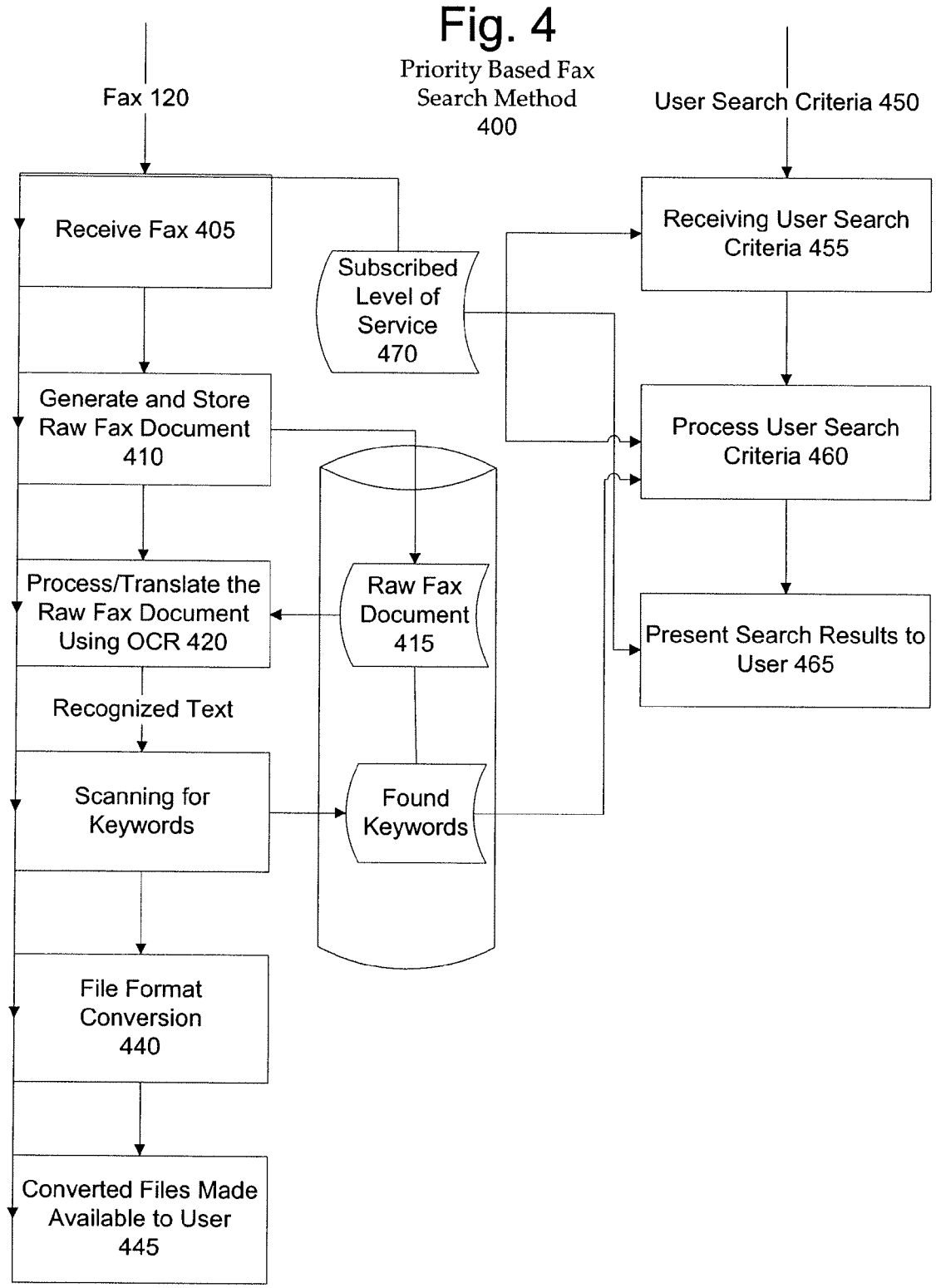

Fig. 5

Formatted Document with Found Key words 475

The word ⎡telefax⎤, short for ⎡telafacsimile⎤ for "make a copy at a distance", is also used as a synonym. Although, ⎡"fax"⎤ is not an acronym, it is often erroneously written as such (⎡"FAX"⎤). The device is also known as a ⎡telecopier⎤ in certain industries. When sending documents to people at large distances, ⎡faxes⎤ have a distinct advantage over postal mail in that the delivery is nearly instantaneous.

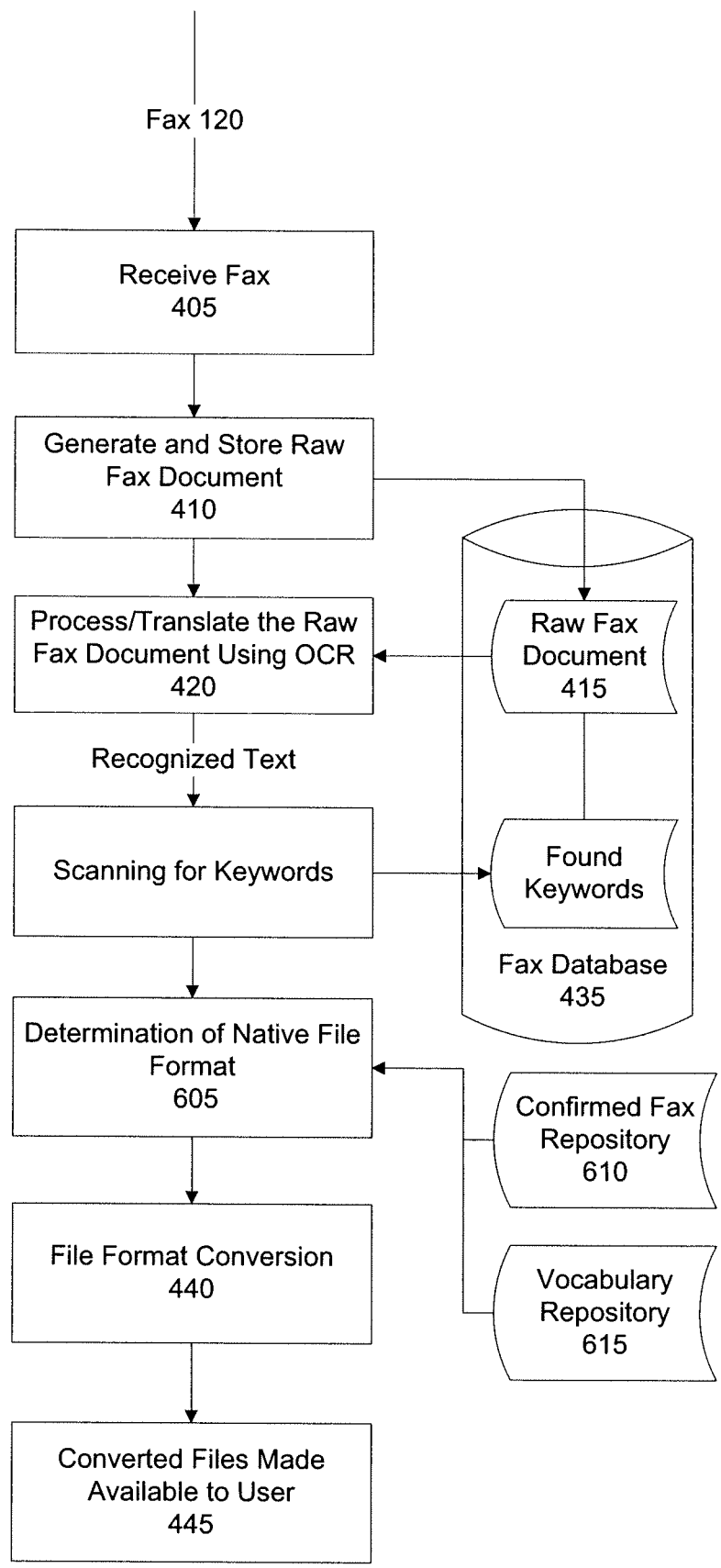

INTERNET FAX MESSAGE SEARCHING AND FAX CONTENT DELIVERY USING KEYWORD DETECTION

BACKGROUND

An embodiment of the invention generally relates to searching previously received telephony fax messages, which have been electronically stored in a database and are searchable by keyword. Other embodiments are also described.

Facsimile (fax) message services provide an easy method of securely transporting documents to distant locations without the need for large changes to communications infrastructure. Unlike electronic mail which requires an Internet connection, modern fax machines can operate over the Plain Old Telephone System (POTS) without the need for an additional service. Furthermore, fax protocols are not restricted to utilizing the POTS but instead can also utilize Fax Over IP (FOIP) technology. Thus, sending documents through fax machines is expected to remain a popular means of communication because the sending and receiving parties do not require modifications to their home communications infrastructure and instead can to use both old and modern networks. In addition, the parties have a reasonable level of assurance that the sent document was in fact received by the intended recipient and was not altered along the way by any unauthorized parties.

Modern fax messaging services, such as those operated by j2 Global Communications of Hollywood, Calif. use the Internet to provide even greater flexibility for subscribers to transmit and receive faxes. For example, with the j2 Global Send service, a subscriber attaches a document that is to be faxed to an email message, and addresses the email message to a j2 Global domain name, where the destination fax number appears as the prefix in the email address. The email is then sent, from the user's Internet connected computer, to the j2 Global internal data network where it is converted and then transmitted as a fax protocol transmission.

Fax messaging services may also include an inbound or receive service, where the subscriber is assigned a unique, direct inward dial (DID) telephone number, which the user distributes to others who wish to send a fax to the user. This telephone number is in effect the user's individual fax number. When an incoming fax is received at a particular DID number, a fax server network in the j2 Global internal network converts the received fax transmission into a format that is compatible with sending or accessing documents over the Internet. For example, an image file containing the received fax image may be attached to an email, which is then sent to the subscriber's email address. Another option for the subscriber is to log into a j2 Global website and then access a posted fax message on the website, where the fax message is stored in a virtual mailbox of the subscriber by j2 Global. In both cases, the image file is transferred over the Internet and may then be displayed on the user's Internet connected computer as the received fax transmission.

Although sending and receiving faxes involves a relatively simple set of tasks from a user standpoint, it is difficult for users who receive a large amount of fax transmissions to later find a particular fax document and extract information from it. A limitation of communication through fax machines is the complexity involved in organizing, storing and searching through a large set of received faxes. There has been a suggestion for fax capture technology that can operate in two modes. In an automatic mode, the fax device automatically, i.e. without user intervention, captures received facsimile or document data and transmits the data to a file management apparatus accessible over a network. In a manual mode, the fax device selectively captures and modifies received document data based upon additionally received external input data specified by the user. The FMA is said to provide document capture, archiving and indexing services to the network.

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one.

FIG. 2 is a diagram showing the sending party side of the fax delivery and storage system.

FIG. 3 is a diagram showing the user side of the fax delivery and storage system.

FIG. 4 is a state diagram representing an example process flow for a priority based fax indexing and search method, in accordance with an embodiment of the invention.

FIG. 5 is a screenshot of a formatted document after keywords have been selected.

FIG. 6 is a state diagram representing an example process flow for a native file format analysis method, in accordance with an embodiment of the invention.

DETAILED DESCRIPTION

Figure 1:
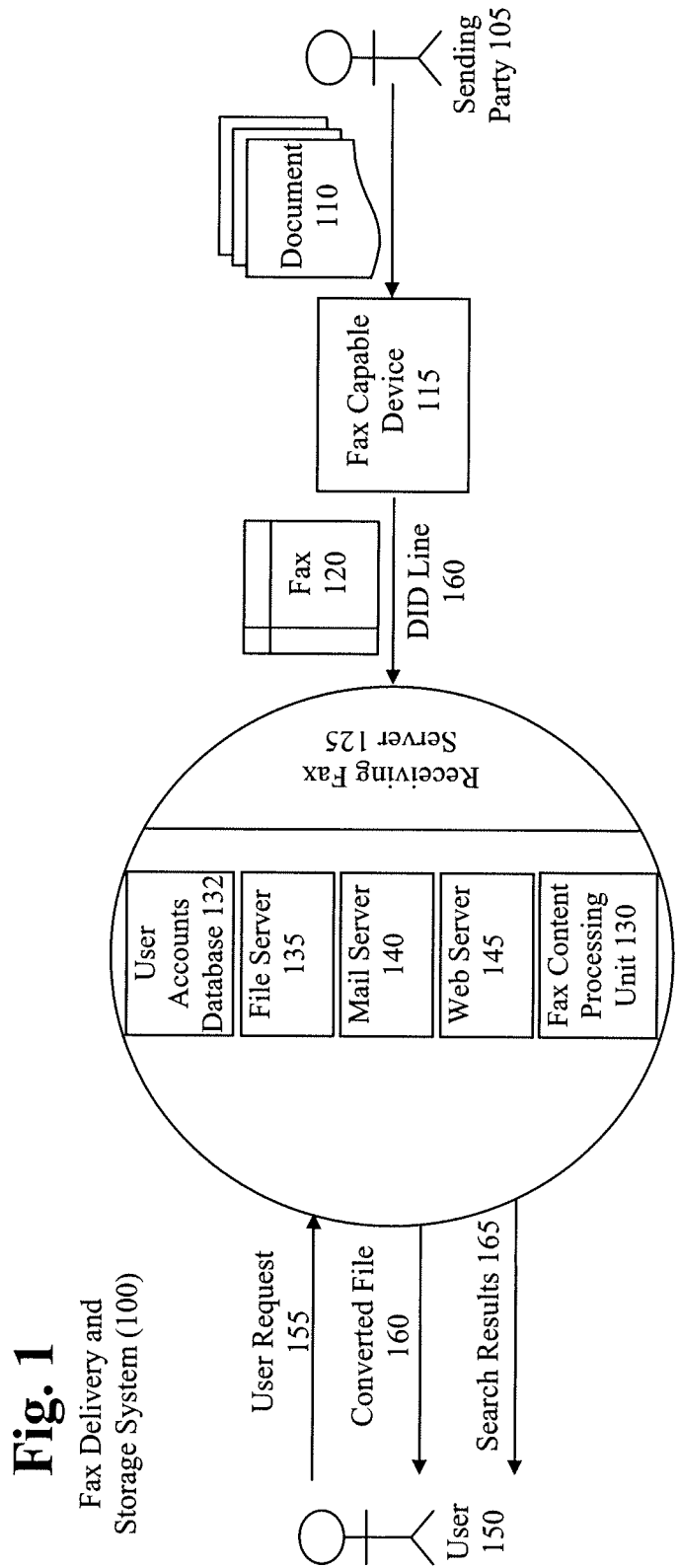
FIG. 1 is a diagram showing an example fax delivery and storage system that assigns its subscribers respective DID lines for receiving fax messages, delivers the fax messages to their respective owners via the Internet, and gives the owners the ability to perform a text-based search over the Internet of their received fax messages.

An embodiment of the invention is a computer system that hosts or provides an internet fax service, to essentially any member of the public who agrees to become a subscriber of the service. The term "computer system" or "system" as used here may also refer to a private network of connected machines. The system assigns each subscriber his own or unique personal telephony number, from an available pool of such numbers that have been reserved for the system, under separate agreement with one or more telephone companies (e.g., local exchange carriers, wireless carriers or network operators). A separate direct inward dial (DID) line is associated with each subscriber number. The DID lines are routed by the Public Switched Telephone Network (PSTN) to a network of fax servers (abbreviated here as simply "fax server") in the system. Note that there may be several subscribers who are part of a group or corporate account.

An incoming fax call on a DID line may be verified by the system to be that of a current subscriber (a user), by accessing subscriber account information that is stored in a database of the system. The user's subscriber status or subscriber classification is thus determined, including whether or not the user is subscribed to the Internet fax service and the subscriber's level of service (e.g., free services only; all services within a Basic plan; all services within a Premium plan, etc.) The call is answered by the fax server and then a fax transmission is received on the DID line (e.g., in accordance with a Group 3 fax protocol or a similar substitute) from a sender, fax-capable machine.

A fax message (document) arriving in the transmission is recorded as part of a raw fax document file, e.g. in TIFF or other suitable scanned image file format, the latter being thus derived from the transmission. Once the fax message has been successfully transferred, the fax transmission is terminated and the call is disconnected, thus freeing up the subscriber DID line for another incoming call.

The received message is then made available to the subscriber (and not others), through an internet, e.g. the Internet. For example, the subscriber may have identified to the system his external email address, or he may have been assigned an internal email address by the system, to which the fax message is to be forwarded by the system upon receipt. This instruction would be stored as part of the user's account information, which the system would check to determine where and how to forward the message. In addition to or as an alternative to email forwarding, the account information may have instructions for the system to forward by posting the message to the user's personal web site. Another approach is to store the message (until it is retrieved over the Internet by the user), and send a notification or alert to the user that a new fax message has been received for him (e.g., as an email message containing an http or https link to the stored message). Suitable mail or web servers may be provided as part of the system to implement such functionality.

The system also performs the following operations, on a per user basis and depending on the user's subscriber status or classification, for providing a fax search service to its subscribers. The system checks the user's account information to determine whether or not he is subscribed to the search service. If so, the raw fax documents of each user may be retrieved from storage (e.g., via a file server that is part of the system) or are processed soon after they have been received by a fax server, using optical character recognition (also referred to here as digital character recognition as the process may not actually involve any "optical" processing) to extract raw text therefrom. The extracted raw text is scanned to find keywords therein. The keywords may be predefined terms such as "contract", "agreement", "invoice", and "bill" that are expected to be present in most fax messages in general. A found keyword may also be a unique term in the fax message that is being scanned, or is one that does not occur very frequently in the message. The found keywords are then stored in association with their raw fax documents in a database. A fax content processing server within the network may be allocated to perform such tasks.

Note that in addition to found keywords, a fax message may also be associated with its stored transactional data which may include the DID line number over which it was received by the fax server, date and time of receipt, calling number, number of pages, and the name of its owner (subscriber).

Thereafter, the user can login over the Internet (e.g., at a Web site) to a user interface that is maintained by the system. The user will then be prompted to enter a search or query, which is a request to search amongst his fax messages. The prompt may refer to one or more of the following fields of search associated with each fax message: text in the body or cover page, date of receipt (including a date range), calling party number, and number of pages (including a range). For group or corporate accounts, there may also be an administrative login defined that allows an admin user or master user to search the faxes of all users of a group or corporate account.

After receiving the search request from the user, the system extracts search terms from the request and then searches amongst the found keywords and transactional data that are stored in the database to find ones that sufficiently match one or more of those terms. The results of the searching are then made available over an Internet to the user. For example, pointers or links to those stored raw fax documents of the user that are associated with keywords which satisfy the designated search criteria, may be displayed to the user over the Internet, e.g. on the system's Web site. The user can then click on the displayed link to download the corresponding raw fax document for display on his client machine.

There may be two or more fax searches that are in process within the system, at any given moment. As the system scales to thousands or tens of thousands of subscribers, the likelihood of such a situation, where several fax search requests are pending, increases significantly. Moreover, the number of simultaneously pending requests also increases significantly. This may place a heavy computing and storage load on the system, thereby adversely affecting the performance of a given one of the searches.

In one embodiment, the search-related operations performed on received faxes are prioritized based on a subscriber's level of service. The operations may include storing faxes, converting faxes to their native file format (also referred to recreating or restoring the native file format), scanning and extracting keywords from faxes that have been processed by a digital character recognition engine, tagging faxes with keywords specified by their owners, indexing by deriving a "gist" which is a phrase or term based on the extracted keywords from a fax and then associating the gist with the fax, and searching amongst the stored faxes based on search criteria. An issue that arises with the receipt of large numbers of faxes is a diminishment in performance of such search services. In accordance with an embodiment of the invention, a subscriber's level of service is provided as input to a given operation involving that subscriber's received faxes. In particular, performance of the fax processing operations is prioritized based on the subscriber's level of service. This helps maintain an acceptable level of performance for servicing the subscribers to the search service who are willing to pay extra for a premium level of service.

In accordance with another embodiment of the invention, a received fax, namely the raw fax document derived from the fax transmission, is analyzed to restore the raw fax document into its native file format, e.g. restore a TIFF fax image into the wordprocessor file format from which it likely originated. The fax message now in its native file format is then made available to its owner over the Internet, in that format. This allows the owner/user to make more valuable use of her received faxes by for example immediately opening the native file format document using the corresponding application program, and beginning to edit it within the application program.

In another embodiment, rather than restore the raw fax document into its native file format, a restoration is performed on a received fax message, so as to restore its original style (e.g., paragraph spacing, indenting, centering and document margins), color and/or font. Such a restored fax document, though likely being true in many aspects to the native computer document from which the fax originated, may or may not be in the native file format.

The following is a system in which system these and other embodiments of the invention described below may be implemented.

Fax Delivery and Storage System

FIG. 1 illustrates an example fax delivery and storage system 100, e.g. one that may be used for a priority-based fax search method 400 (FIG. 4) and a native file format analysis method 600 (FIG. 6). An overview of the elements of the system 100 and their basic interaction with each other is first given, followed by examples of particular instances of how the system may be used to service a subscriber's fax indexing and search needs.

In the fax delivery and storage system 100, a sending party 105 transmits a document 110 through a fax capable device 115. Note the document 110 may be an electronic document in a native file format, such as a wordprocessor file, an accounting program or spreadsheet file, or a presentation program file. The fax capable device 115 sends the document 110 as a fax message (or simply "fax") 120, via a fax protocol transmission, to a receiving fax server 125. The receiving fax server 125 passes the fax 120, as a raw fax document file having for example an image format such as TIFF, to a processing unit 130 which in conjunction with a file server 135, a mail server 140 and a web server 145 perform the fax keyword processing and search method 400. Note the term "server" as used here refers to server software and/or server hardware that may be distributed across different nodes of a private data network. The private data network may be a virtual private network spread across the Internet, for example, using VPN links or other types of secure links over the Internet.

The file server 135 stores and distributes the fax messages 120 and data derived from the faxes 120 (e.g., recognized text and found keywords) within the servers or processing units in the system's private data network. The file server 135 may be capable of transferring data through any one or more of a variety of protocols including the File Transfer Protocol (FTP), the Server Message Block (SMB) protocol, the Network File System (NFS) protocol, and the NetWare Core Protocol (NCP).

The mail server 140 transfers faxes 120 and data derived from the faxes 120 to users 150 (e.g., subscribers) and in particular to their machines, over an internet, e.g. the public Internet. The users' machines may be networked computers that are outside or external to the private data network of the system 100. In one embodiment, the mail server 140 is a Microsoft Exchange server, which sends re-formatted versions of incoming faxes (that have been addressed to a subscriber) to the subscriber's email address.

The web server 145 makes faxes 120 and data derived from faxes 120 available to users 150 over other non-fax communication channels, e.g. http and https connections. In one embodiment, the web server 150 is an Apache web server that authenticates a login request from a subscriber and then enables a stored, re-formatted version of a previously received fax to be downloaded over the Internet to the subscriber's client machine for viewing.

The fax content processing unit 130 analyzes and performs various fax processing operations such as those described above and further below, including for example image file format conversion (e.g., Binary Fax Transfer format to TIFF), digital character recognition (also referred to here as optical character recognition or OCR), native file format processing, keyword scanning and indexing of the faxes 120. The fax content processing unit 130 may also assign tasks to off site servers. The fax content processing unit 130 performs user requests 155 for fax keyword scanning and search services based on priority levels that are a function of the class of service subscribed to by the requesting user 150.

Although FIG. 1 only shows a single sending party 105 and a single user 150, the system 100 is of course designed to accept incoming faxes simultaneously for a large number of users 150, as a function of the number of incoming fax channels that are active in the receiving fax server 125. A user accounts database 132 may be included, also in the private data network as shown, that stores the current account information of each user. Such information may include: personal information that identifies or helps authenticate the user, his assigned DID line number, one or more addresses to which his incoming faxes are to be delivered (e.g., forwarding phone numbers, Internet Protocol, IP these are the same thing (IP and Internet Protocol), addresses, and email addresses), his personal payment processing information, the current status of his account (e.g., valid or suspended), and the services to which he is subscribed including options such as whether or not the system is to automatically convert his received faxes into native file format, and the manner in which his received faxes are to be accessed or delivered to him.

Turning now to FIG. 2, this figure further illustrates the originating or source side of the fax delivery and storage system 100. The delivery side is depicted in FIG. 3. FIG. 2 describes how the originating side of the system 100 can support a variety of different ways in which a fax 120 may be originated and received by the receiving fax server 125. A sending party 105 seeking to send a document 110 to a user 150 may connect to the receiving fax server 125 through a DID line 160 that has been assigned to the user. This may be done by dialing a unique telephony number of the DID line assigned to the user 150. The receiving fax server 125 may be capable of simultaneously accepting faxes 120 from separate sending parties 105 using different types of fax capable devices 115. For example, the sending party 105 can send a fax 120 through the use of a standalone fax machine or copier 205 or a fax ready personal computer 210 that is connected to a public switched telephone network (PSTN) 230 or Integrated Services Digital Network (ISDN) 235 through a fax modem. Sending parties 105 could also send a fax 120 using a mobile PDA/smart phone 215, a personal computer, or other device capable of transmitting using a Fax Over Internet Protocol (FOIP), through in effect a FOIP network 240. The sending party 105 may alternatively send a fax in accordance with an existing Internet fax sending service in which the document 110 is for example emailed over the Internet to a routing fax server 225. The routing fax server 225 receives fax requests from the sending party 105 through a non-fax protocol, such as email or a Web site upload. It then forwards the document as fax 120, through a fax protocol such as the G3 standard, to the destination fax number specified by the sending party 105 (which terminates at the receiving fax server 125).

Having described the fax originating side of the system 100, we now turn to FIG. 3, which further illustrates the fax delivery side of the system. In one embodiment, a user 150 (e.g., subscriber) can send a request over the Internet 325 to the private data network, to retrieve a stored fax. The user may also be able to send a request to have a particular stored fax (that may have been previously identified to the user 150 via an alert or notification message) delivered or forwarded to a specified destination. Such requests may be submitted by the user through a short message service 305 (e.g., the user's cellular network-capable smart phone) or through a web browser 310 (e.g., the user logging into the system's web site). Alternatively, the user can arrange for his received faxes to be "pushed" to his email client 315 or to his personal web site (e.g., through an RSS feed) or to a messaging application client that is running on his machine. In yet another alternative, a user 150 can send a request to the private data network via a two-way voice call over the PSTN 230 (e.g., by calling into an interactive voice response system that is running in a voice server in the private data network) using a phone 320, where such requests are then automatically translated into commands to retrieve a particular fax or check for the user's latest faxes in the system.

The preceding described an illustrative system upon which an intelligent Internet fax service method operates. The following describes a priority based implementation of the fax keyword processing and search method described above.

Prioritized File Storage on Customer Class

FIG. 4 illustrates a priority based fax keyword processing and search method 400. The method 400 includes the operations of receiving a fax 120 (operation 405), generating and storing a raw fax document 415 from the fax 120 (operation 410), processing the raw fax document to recognize text therein (operation 420), scanning the recognized text for keywords (operation 430) and storing the found keywords 475 in association with the raw fax document 415 in a database 435, converting the raw fax document to a set of preferred and/or subscriber-selected formats (operation 440), and making the converted files available to the user (operation 445). Any one or all of the operations 420, 430, 440 that are performed based on a received fax may be performed depending upon or based on the status or classification of the associated user 150 or owner of the fax. For example, the status or classification may be the level at which the user 150 has subscribed to fax services (subscribed level of service 470, e.g. free vs. standard vs. premium).

In one embodiment, each user 150 is associated with a subscribed level of service 470 at the time of initial subscription. The level of service 470 is updated whenever the user 150 upgrades to a more premium level of service. An inbound fax service software component running in the system determines the subscribed level of service 470 by accessing the user's account information, which may be stored in a database. In one embodiment, the user's subscribed level of service 470 is either active, non active, premium, or standard. The user's status or classification (e.g., subscribed level of service 470) may be attached to each of the fax processing operations that might be performed upon a fax 120 of the user 150.

In one embodiment, each of the operations 420, 430, 440 may be prioritized differently, depending on the user's subscriber status or classification. In one embodiment, the user's subscribed level of service 470 is stored within the fax content processing unit 130 (see FIGS. 1-3) for use during fulfillment of operations. The processing speed of an operation (which may be governed by the amount or type of computing and storage resources that are allocated to it) is then directly related to or dictated by the user's subscribed level of service 470. For example, referring also to FIG. 3, an indexing operation performed on faxes owned by a user 150_1 who has a "higher" level of subscribed service 470 gets priority over an operation associated with another user 150_2 who has a "lower" subscribed level of service 470. In one embodiment, the higher priority operation is completed (in its entirety), prior to the lower priority operation being started or completed in its entirety. In another embodiment, the operations for the two users 150_1, 150_2 are performed simultaneously through time-division multiplexing, with priorities attached to each operation such that the higher priority operation receives more attention (or is allocated a larger time slice) within the fax content processing unit 130.

The preceding discussion of prioritization refers to certain data processing operations that are performed upon the faxes 120. These operations may be described as follows, on a "per fax" or "per user" basis (with the understanding that such operations are duplicated and may be performed simultaneously, i.e. their performance overlaps, for a large number of received faxes and users of the system 100).

Receiving a Fax

A fax 120 is received by the receiving fax server 125 over a DID line 160. The fax 120 originated as a document 110 which a sending party 105 sent through a fax capable device 115. Each fax 120 is owned by a user 150. A fax 120 is owned by the user 150 whose designated DID line 160 was used to transport the fax 120.

Generating and Storing a Raw Fax Document

Following receipt of a fax 120 from a sending party 105, the fax 120 is converted to a raw fax document 415 (operation 410). The receiving fax server 125 may store the raw fax document 415 in a fax database 435 using the file server 135. The fax database 435 stores the raw fax document in a designated file format. Possible file formats for the raw fax document include Joint Photographic Experts Group (JPEG), Tagged Image File Format (TIFF), Portable Network Graphics (PNG), RAW, Graphics Interchange Format (GIF), and Computer Graphics Metafile (CGM).

Processing the Raw Fax Document to Produce a Formatted Document

After storing the raw fax document, the raw fax document (or "fax image") may be processed or translated into machine-readable text (operation 420). This operation may be subject to the owner or user 150 of the raw fax document having signed up for the fax search or native file format or restoration services introduced above. Content within the image or raw fax document could be comprised of handwritten, typewritten, or printed text. The translation of images to machine-readable text is performed through digital character recognition or Optical Character Recognition (OCR). In some cases, the entire raw fax document is translated into machine-readable text the full details of which are then stored in a formatted document, also referred to as a fully OCRed or recognized file. The formatted document could be a text, rich text, or any other file format capable of storing text strings.

Scanning the Recognized Text for Keywords

The recognized text portions of the raw fax document 415 are scanned and analyzed by a keyword detection process (operation 430). The keyword detection process parses the machine-readable text to determine which terms should be associated with the raw fax document 415. FIG. 5 illustrates or gives an example of the keyword detection process. The boxed words are keywords that have been selected from or found in the full OCR text document. The keyword detection process outputs a series of found keywords, which are subsequently associated with the raw fax document 415 (and in this case the formatted document 425). The found keywords can be stored in the fax database 435 and linked to the corresponding formatted document 425 and/or the raw fax document 415. Following the keyword analysis, the formatted document 425 may also be stored in the fax database 435 and associated with the corresponding raw fax document 415.

Conversion to a Preferred Set of File Formats

The user 150 may be allowed to select one or more file formats into which the formatted document 425 and/or the raw fax document 415 can be converted. Conversion may be defined as the production of a file (converted file 160—see FIG. 1) in a new format that includes essentially all of the content in the formatted document 425 and/or raw fax document 415. The conversion may involve restoring the original styles, colors and/or fonts, orientation and skew such that they match the appearance of the document 110 from which the fax 120 originated (see FIG. 1). In one embodiment, conversion is performed by re-mapping the individual graphical image elements into a converted file 160 according to the spatial coordinates captured in the fax 120 of the document 110. Where possible via the spatial information collected at the time of scanning, file structures are utilized in the converted document 160 as appropriate. For example, text/graphic elements appearing in a header or footer location in the document 110 are re-created as headers and footers, respectively, in the converted document 160. Further, margins are created in the converted file 160 which correspond to the margins represented in the document 110. Moreover, paragraph spacing in the converted file 160 is set to match the ascertained paragraph spacing present in the document 110.

Further, the user 150 can request the system to perform a conversion of the fax 120 to an audio format through a text-to-speech conversion. In that case, the conversion file 160 is an audio file containing the synthesized speech corresponding to the text in the full OCR version of the fax 120. Moreover, the user 150 can request creation of a synopsis of the fax 120 with the use of found keywords associated with the formatted document 425. In cases where words of the fax 120 cannot be translated, a neural network formed for the untranslated words may be consulted.

Making the Converted Files Available to the User

After the fax 120 has been converted to the designated file format, the converted file is made available to the user 150 (operation 445). The converted files are made available to their users 150 through several mediums, including through email, over the World Wide Web, through short message services, and through voicemail (after conversion of the fax to an audio format).

Search Operations

Referring back to FIG. 4, the users 150 can perform searches on their received faxes 120 based on the user's inputted search criteria 450. A user 150 enters search criteria 450 which are received by a search procedure running in the system (operation 455). The search criteria 450 may be entered by the user 150, after the user has logged into his user account, through a web interface (a local browser application) or through a different, local application that connects with the private data network over the Internet. Subsequent to receipt, the search criteria 450 are processed (operation 460). The user 150 is able to search faxes 120 which he/she owns. A fax 120 is owned by the user 150 whose designated DID line 160 was used to transport the fax 120. The search procedure permits the user 150 to search various attributes related to the fax 120 including the associated, found keywords 475 that are stored in the database 435, by comparing the designated search criteria to the associated found keywords 475 of his faxes. The user 150 may also search fax characteristics or transactional data. Searchable fax characteristics or transactional data include the date and time the fax 120 was received, the sending fax number, the number of pages received, etc. Search criteria 450 can be composed using various searching techniques including natural word and Boolean search methods.

The search results may be presented as a hit list of those faxes 120 whose transactional data and/or associated, found keywords meet the search criteria (operation 465). The search results may be presented to the user 150 through a web interface hosted by the web server 145. In one embodiment, the user may set up a search that is automatically repeated periodically, and the search results are electronically mailed to the user through use of the mail server 140. The hit list of search results gives the user 150 access to each of the faxes 120 listed, and the user can select any one of the listed faxes 120 to be viewed. The user 150 may also select the file format in which a selected fax 120 will be presented or delivered to him. In one embodiment, a list of available file formats, from which the user 150 can select, are stored in the user's preference settings (part of her subscriber account information). Possible format options include, e.g. PDF, TIFF, a proprietary format such as EFX, Native, and Restored. If the Native option is selected, then the user may be given the further choice of manually selecting from amongst a number of previously defined formats, which are used by various applications, including wordprocessor, spreadsheet or accounting, presentation, and computer aided design/computer aided manufacturing. Alternatively, the user may elect that the system automatically recreate the fax 120 in its native file format, by "guessing" the true native file format of the fax, through an automated process as described below.

Native File Format Analysis

FIG. 6 illustrates a native file format analysis method 600 that automatically attempts to restore a given fax 120 into the true native file format of the document 110 from which the given fax 120 originated, by selecting from amongst several known formats (see FIG. 1). This is part of a process for recreating or restoring the raw fax document to its original format, i.e. that of the document 110. The method 600 includes several of the operations described above including receiving a fax 120 (operation 405), generating a raw fax document 415 from the received fax 120 (operation 410), processing the raw fax document 415 to produce a formatted document 425 (operation 420), and scanning the formatted document 425 for keywords (operation 430). In addition to those operations, the method 600 includes operation 605 in which the raw fax document 415 is analyzed to selected a native file format. Thus, rather than rely on the user 150 to manually select the native file format for a given fax 120, operation 605 performs an automatic analysis of the data derived from the fax 120 (as described below). The formatted document 425 and/or the raw fax document 415 may then be converted to the selected, native file format (operation 440). The converted file is then made available to the user 150 as described above (operation 445).

A guess of the native file format can be obtained as follows. The raw fax document 415 is analyzed by comparing the raw fax document's file patterns against those in a repository of confirmed faxes 610 with associated file patterns. The repository of confirmed faxes 610 contains raw fax documents 415, and their respective formatted documents 425, with known or verified native file format, NFF, settings, respectively. In one embodiment, the verification of a selected NFF setting for a given fax (in the repository of confirmed faxes 610) is based on responses from its respective user 150 (owner) to a previous attempt at selecting the NFF of the fax, performed by the system 100. The response would be positive if the selected NFF was correct, and negative otherwise. A positive response would result in storing the raw fax document 415 and/or formatted document 425 together with the correctly selected NFF, in the repository of confirmed faxes.

In another embodiment, a NFF selection for a given fax (operation 605) is made by comparing certain found keywords of its associated raw fax document or formatted document 425, with corresponding keywords of entries in the repository of confirmed faxes 610. Fax messages with similar carefully chosen keywords are more likely to have originated from the same native file format.

In another embodiment, the machine-readable text in the formatted document 425 of a given fax 120 is compared against a vocabulary repository 615. The vocabulary repository 615 may identify certain groups of one or more words, each of which may be associated with certain file formats. Thus, one or more of such groups of words might appear in the formatted document 425, in which case the file format associated with those groups would become the guessed NFF of the document 425. Several different vocabulary files may be provided in the system, e.g. legal profession, medical, dental, and information technology. The comparison may indicate that the fax is likely related to the medical profession. Stored heuristics could then be consulted to further refine the selection of the native file format. For example, the profiles of users of the system who are in the medical profession could be consulted to indicate that most medical professional faxes are converted into PDF, rather than wordprocessor format.

In still another embodiment, a comparative graphics analysis is performed between one or more portions of the raw fax document 415 of a given fax 120 and those of the documents in the repository of confirmed faxes 610. The borders and patterns may be analyzed, including examining spatial coordinates of extracted data within the raw fax document 415. These graphical characteristics are compared against those of files in the repository of confirmed faxes 610. Similarities in these characteristics would suggest that the true or user-preferred NFF of the raw fax document 415 is likely to be that of one or more matching entries in the repository of confirmed faxes 610.

The use of probability and heuristic methods may be helpful to improve the guess of the true NFF. The probability methods include Bayesian probability techniques. In one embodiment, probability grades are attached to several possible native file formats, for a given fax 120. The NFF having the highest probability is then chosen to be selected NFF for that fax 120. In one embodiment, the probabilities are calculated based on the similarities in file patterns between the raw fax document 415 of the fax 120 and entries in the repository of confirmed faxes 610. In another embodiment, the probabilities are based on the similarities in word patterns between the formatted document 425 and entries in the vocabulary repository 615. In one embodiment, the user designates a probability threshold. A possible native file format is not selected, unless its assigned probability reaches the user-defined threshold.

The use of heuristics may be explained as follows. Based on a profile of the user, e.g. a history of received faxes from a certain calling party number being reports that have a certain spreadsheet style, a higher or lower probability or expectation may be assigned to each possible native file format, for a new fax. In addition, based on certain recognized words in the new fax, a score may be assigned to assess the extent to which that word is included in a wordprocessor or spreadsheet file. For instance, if the new fax contains the phrase "Invoiced amount due $400", there may be a 0.6 probability that the fax is an invoice and a 0.4 probability that it is a sales sub ledger report. Based on the stored profile of the user (within his account information), who may happen to be an accounts payable clerk (and such would be noted in his profile), there is a higher expectation that he would receive an invoice rather than a sales sub ledger report. In that case, since it is more likely the fax is an invoice in this case, the system would check the history of received faxes that have been characterized as invoices (considering for example the data from all users in the system). If it happens that the selected native file formats of such "invoice" faxes have been either PDF or wordprocessor format, then the system may further check the user profiles of other accounting clerks in the system. That may suggest the more likely format is wordprocessor, in which case the selected native file format for the new fax would become wordprocessor.

In the event the conversion of the fax into the selected NFF was incorrect or was not preferred by the user, the user may signal this to the system through for example the system's web site or directly through the email message in which the NFF document was delivered to the user. In response, the system may present the user with several questions whose answers from the user will help the NFF conversion engine to learn why it made a mistake in its NFF selection. This native file format correction or user preference information is then logged by the system, to be used for informing future native file format conversions by the system upon the user's faxes. For example, based on historical errors logged by the system, the system will recognize that errors in NFF selection usually occur for one of just a handful of reasons, e.g. inaccurate user profile information, and unique or unusual user preference compared to the rest of the users in the system.

A system for a fax delivery service has been described that comprises: means for receiving fax messages on a plurality of direct inward dialing (DID) lines assigned to a plurality of users of the service, respectively; means for storing raw fax documents associated with the received fax messages, respectively; means for storing the users' account information including information that determines each of the users' subscriber status or subscriber classification including whether or not the user is subscribed to the service; means for making the fax messages available to the users, respectively, over an Internet and in accordance with the account information; means for processing the raw fax documents to recognize text therein; means for finding keywords in the recognized text; means for storing found keywords in association with their raw fax documents; means for receiving a plurality of requests that include search criteria for message searches, from two or more of said users; means for processing the requests to find previously received raw fax documents whose associated keywords match the search criteria; and means for making results of the request processing available to said two or more of the users over an internet.

A machine-implemented method has been described that comprises: storing in a database account information about a customer; upon receiving, on behalf of the customer, an incoming fax message and its associated calling party number via the PSTN, retrieving the customer's account information including the customer's format conversion preference, based on the calling party number; and converting the fax message to a file format indicated by the customer's retrieved format conversion preference as being associated with a calling party number.

A machine-implemented method for providing a data processing service has been described, comprising: storing in a database account information about a customer; upon receiving a search request from the customer, retrieving the customer account information which includes the customer's status or classification being one of active, inactive, premium, or standard, to determine a processing speed based on the customer's status or classification; and relaying the processing speed to a processing server, wherein the processing server is to then retrieve files from a storage server and process them in accordance with the processing speed.

A machine-implemented method for providing a hosted internet fax service has been described, comprising: processing a raw fax document, that has been derived from a fax transmission intended for a user of the internet fax service, to restore an original style including paragraph spacings and margins, a color, and/or a font of a document from which the fax transmission originated, wherein the processing results in a restored document that includes a restored style, restored color, or restored font and that incorporates essentially all language content of the raw fax document; and making the restored document available to the user over an internet.

The applications of the present invention have been described largely by reference to specific examples and in terms of particular allocations of functionality to certain hardware and/or software components, e.g. fax server software, mail server software, web server software, and fax content processing software, all running on one or more computers that are nodes of a private network. However, those of skill in the art will recognize that the data processing services described above can also be implemented by software and hardware that distribute the functions of embodiments of this invention differently than described above. Such variations and implementations are understood to be apprehended according to the following claims.

An embodiment of the invention may be a machine-readable medium having stored thereon instructions which program one or more processors or computers to perform some of the operations described above. In other embodiments, some of these operations might be performed by specific hardware components that contain hardwired logic. Those operations might alternatively be performed by any combination of programmed computer components and custom hardware components. The term "processor" as used here may refer to one or more processors that may be networked or otherwise linked with each other.

A machine-readable medium may include any mechanism for storing or transmitting information in a form readable by a machine (e.g., a computer), not limited to Compact Disc Read-Only Memory (CD-ROM), Read-Only Memory (ROM), Random Access Memory (RAM), and Erasable Programmable Read-Only Memory (EPROM). The term "machine-readable medium" as used here may refer to a distributed medium, such as multiple storage devices that are in different computers that are network or otherwise linked with each other.

While certain embodiments have been described and shown in the accompanying drawings, it is to be understood that such embodiments are merely illustrative of and not restrictive of the broad invention, and that this invention should not be limited to the specific constructions and arrangements shown and described, since various other modifications may occur to those of ordinary skill in the art.

What is claimed is:

1. A machine-implemented method for providing an Internet fax service, comprising:
   (a) receiving messages through fax transmissions on a plurality of direct inward dialing (DID) lines assigned to a plurality of users of the service, respectively, and storing raw fax documents derived from the received fax transmissions, respectively;
   (b) retrieving the users' account information to determine each of the users' subscriber status or subscriber classification including whether or not the user is subscribed to the Internet service;
   (c) making the received messages available to the users, respectively, over an Internet and in accordance with the users' account information;
   (d) performing the following on a per user basis according to the user's subscriber status or classification,
      (i) processing the raw fax documents using digital character recognition to extract text therefrom,
      (ii) scanning the extracted text to find one or more specified keywords therein, wherein the found keywords are a subset of the extracted text,
      (iii) storing the found keywords in association with their raw fax documents in a database;
   (e) receiving a plurality of requests for message searches, from two or more of said plurality of users, respectively, in accordance with each user's account information;
   (f) processing each one of the plurality of requests by searching amongst the found keywords that are stored in the database to find ones that satisfy search criteria designated by each one of the plurality of requests; and
   (g) making results of the searching available over the Internet to said two or more of the plurality of users, respectively, in accordance with each user's account information.

2. The method of claim 1 further comprising:
   prioritizing one or more of the (i) processing, (ii) scanning and (iii) storing, depending upon subscriber status or subscriber classification.

3. The method of claim 1 further comprising:
   processing the raw fax documents using digital character recognition to produce formatted documents, respectively, wherein the formatted document contains essentially all recognized text from its respective raw fax document; and
   storing the formatted documents in association with their raw fax documents, respectively, in the database.

4. The method of claim 1 wherein the processing the plurality of requests is prioritized depending on subscribed level of service of said two or more of the users.

5. The method of claim 1 wherein the search results identify fax messages that are associated with the found keywords that satisfy the search criteria, the method further comprising:
   making the identified fax messages available for download over the Internet to said two or more of the plurality of users, respectively.

6. The method of claim 1 further comprising:
   tagging one of the received messages with a keyword designated by its owner, wherein the owner is one to whom is assigned the DID line on which the fax transmission, from which the received message was derived, occurred.

7. The method of claim 1 further comprising:
   looking up a keyword that is either designated by an owner of one of the received messages or is a found keyword, to find a related keyword, and tagging said one of the received messages with both the keyword and the related keyword.

8. The method of claim 1 further comprising:
   on a per user basis, serving an advertisement that has been selected based on found keywords that are associated with the raw fax documents of one of the plurality of users.

9. A machine-implemented method for providing an internet fax service, comprising:
   (a) receiving messages through fax transmissions on a plurality of direct inward dialing (DID) lines assigned to a plurality of users of the service, respectively, and storing raw fax documents derived from the received fax transmissions, respectively;
   (b) retrieving the users' account information to determine each of the users' subscriber status or subscriber classification including whether or not the user is subscribed to the Internet service;
   (c) making the received messages available to the users, respectively, over an Internet and in accordance with the users' account information;
   (d) performing the following on a per user basis and unique to each user according to the user's subscriber status or classification,
      tagging the raw fax documents of a user, separate from the documents' filenames, with keywords specified by the user, including storing the raw fax documents in association with keyword tags in a database;
   (e) receiving a plurality of requests for message searches, from two or more of said plurality of users, respectively, in accordance with each user's account information;
   (f) processing each one of the plurality of requests by searching amongst the keyword tags in the database to find ones that satisfy search criteria designated by each one of the plurality of requests; and (g) making results of the searching available over the Internet to said two or more of the plurality of users, respectively, in accordance with each user's account information.

10. A machine-implemented method for providing an Internet fax service, comprising:
(a) receiving messages through fax transmissions on a plurality of direct inward dialing (DID) lines assigned to a plurality of users of the service, respectively, and storing raw fax documents derived from the received fax transmissions, respectively;
(b) retrieving the users' account information to determine each of the users' subscriber status or subscriber classification including whether or not the user is subscribed to the Internet service;
(c) making the received messages available to the users, respectively, over an Internet and in accordance with the users' account information;
(d) performing the following on a per user basis according to the user's subscriber status or classification,
   (i) processing the raw fax documents using digital character recognition to extract text therefrom,
   (ii) scanning the extracted text to find keywords, wherein the found keywords are a subset of the extracted text,
   (iii) storing the found keywords in association with their raw fax documents in a database;
(e) receiving a plurality of requests for message searches, from two or more of said plurality of users, respectively, in accordance with each user's account information;
(f) processing each one of the plurality of requests by searching amongst the found keywords in the database to find ones that satisfy search criteria designated by each one of the plurality of requests;
(g) making results of the searching available over the Internet to said two or more of the plurality of users, respectively, in accordance with each user's account information; and
(h) on a per user basis, serving an advertisement that has been selected based on found keywords that are associated with the raw fax documents of one of the plurality of users.

11. A system for providing an Internet fax service, comprising:
a fax sever to receive messages through fax transmissions on a plurality of direct inward dialing (DID) lines assigned to a plurality of users of the service, respectively, and store raw fax documents derived from the received fax transmissions, respectively, wherein the fax server is to retrieve the users' account information to determine each of the users' subscriber status or subscriber classification including whether or not the user is subscribed to the Internet service;
a web server to make the received messages available to the users, respectively, over an Internet and in accordance with the users' account information; and
a fax content processing unit to, on a per user basis according to the user's subscriber status or classification,
   (i) process the raw fax documents using digital character recognition to extract text therefrom,
   (ii) scan the extracted text to find one or more specified keywords therein, wherein the found keywords are a subset of the extracted text,
   (iii) store the found keywords in association with their raw fax documents in a database,
wherein the fax content processing unit is to further receive a plurality of requests for message searches, from two or more of said plurality of users, respectively, in accordance with each user's account information, and process each one of the plurality of requests by searching amongst the found keywords that are stored in the database to find ones that satisfy search criteria designated by each one of the plurality of requests,
wherein the web server is to further make results of the searching available over the Internet to said two or more of the plurality of users, respectively, in accordance with each user's account information.

12. The system of claim 11, wherein the fax content processing unit is to prioritize one or more of the (i) processing, (ii) scanning and (iii) storing, depending upon subscriber status or subscriber classification.

13. The system of claim 11, wherein the fax content processing unit is to further:
process the raw fax documents using digital character recognition to produce formatted documents, respectively, wherein the formatted document contains essentially all recognized text from its respective raw fax document; and
store the formatted documents in association with their raw fax documents, respectively, in the database.

14. The system of claim 11, wherein the processing the plurality of requests is prioritized depending on subscribed level of service of said two or more of the users.

15. The system of claim 11, wherein the search results identify fax messages that are associated with the found keywords that satisfy the search criteria and the web server is to make the identified fax messages available for download over the Internet to said two or more of the plurality of users.

16. The system of claim 11, wherein the fax content processing unit is to further:
tag one of the received messages with a keyword designated by its owner, wherein the owner is one to whom is assigned the DID line on which the fax transmission, from which the received message was derived, occurred.

17. The system of claim 11, wherein the fax content processing unit is to further:
look up a keyword that is either designated by an owner of one of the received messages or is a found keyword, to find a related keyword, and tag said one of the received messages with both the keyword and the related keyword.

18. The system of claim 11, wherein the fax content processing unit is to further:
on a per user basis, serve an advertisement that has been selected based on found keywords that are associated with the raw fax documents of one of the plurality of users.

* * * * *